United States Patent [19]
Tarman et al.

[11] 3,856,928
[45] *Dec. 24, 1974

[54] OXYGEN PRODUCTION PROCESS

[75] Inventors: Paul B. Tarman, Elmhurst, Ill.; Lester G. Massey, Moreland Hills, Ohio

[73] Assignee: Consolidated Natural Gas Service Co. Inc., Cleveland, Ohio

[ * ] Notice: The portion of the term of this patent subsequent to Dec. 24, 1991, has been disclaimed.

[22] Filed: June 7, 1972

[21] Appl. No.: 260,449

Related U.S. Application Data

[63] Continuation-in-part of Ser. Nos. 242,153, April 7, 1972, Pat. No. 3,773,680, and Ser. No. 241,957, April 7, 1972, Pat. No. 3,773,680.

[52] U.S. Cl. .................... 423/579, 23/281, 423/583
[51] Int. Cl. ...................... C01b 13/08, C01b 15/04
[58] Field of Search ...... 423/579, 583, 219; 23/281, 23/221

[56] References Cited
UNITED STATES PATENTS

| | | | |
|---|---|---|---|
| 1,048,812 | 12/1912 | Doherty | 423/583 |
| 3,324,654 | 6/1967 | Squires | 60/39.02 |
| 3,773,680 | 11/1973 | Huebler et al. | 423/579 |
| 3,812,048 | 5/1974 | Massey et al. | 423/219 |

*Primary Examiner*—Oscar R. Vertiz
*Assistant Examiner*—Gary P. Straub
*Attorney, Agent, or Firm*—Molinare, Allegretti, Newitt & Witcoff

[57] ABSTRACT

Process and apparatus for the production of oxygen or enriched air employing a packed bed of an oxygen-accepting solid, e.g. a barium oxide with MgO and CaO, for example $BaO_2$–DQL. The process is substantially adiabatic with respect to the bed, and is characterized by 4-step cyclic operation: Pressurization, oxidation, depressurization, and reduction. The pressure during the oxidation portion of the cycle ranges from 14 - 385 psia, and during reduction from 1 – 45 psia, wherein the ratio of pressure during oxidation to that during reduction is between 1.6 and 15. The half-cycle time, that is the time the reactor is maintained in either oxidizing or reducing mode ranges from 30 seconds to 360 seconds, and the space velocity ranges from 200 – 5,000 SCF/cu. ft. bed-hour. The bed may be operated either cocurrently or counter-currently in either an upflow or downflow mode, and the process temperature may range from 1250° – 1600°F. The air used in the process is dried and rendered $CO_2$-free by conventional means.

15 Claims, 4 Drawing Figures

OXYGEN PRODUCTION PROCESS

CROSS REFERENCE TO RELATED APPLICATION

This application ia a continuation-in-part of our copending applications Ser. Nos. 242,153 and 241,957 both filed on Apr. 7, 1972, now U.S. Pat. No. 3,773,680, and entitled Acceptor Compositions And Method For Oxygen Enrichment Processes and Oxygen Process Pellets, respectively. The disclosures of those applications are incorporated herein by reference for details of the oxygen-accepting solids and general methods of use and preparation.

FIELD OF THE INVENTION

This invention relates to a 4-step cyclic method of production of oxygen or enrichment of air utilizing oxygen-accepting compositions in a substantially adiabatic process. Typical compositions employ a barium oxide with MgO and CaO, for example, $BaO_2$ with dolomitic quicklime (DQL). The process involves specified ranges of oxidation and reduction pressures, a specified ratio of the oxidation pressure to the reduction pressures, and ranges of space velocity, cycle time and temperature. Optionally, compressed air and fuel may be added to lean air exhaust for energy supply, the cycle may be pyramided, and it can employ a third compressor and/or special BaO guard reactors. The process of this invention permits feasible commercial production of oxygen or an enriched air product containing from 22 – 75 percent oxygen for use in a variety of industrial processes.

BACKGROUND OF THE INVENTION

Industry has long sought an economical method of producing oxygen and enriching air, both of which may be used in combustion processes or as a chemical reactant. There are basically two methods for oxygen production or enrichment of air chemical processing, or mechanical compression and cryogenic separation of oxygen or a fraction of air enriched in oxygen. This application concerns chemical processes, which involve the use of an oxygen-"absorbing" compound cyclically manipulated to deliver oxygen.

The classical 19th Century "absorption" processes of Brin and DuMotay involve the reversible "absorption-desorption" of oxygen by chemical compounds under controlled conditions of temperature and pressure. The DuMotay process of 1866 involves the use of sodium manganate which may be in liquid form. This process remains essentially a laboratory curiosity, and is not a significant commercial process.

The Brin-type processes are based on the 1861 discovery by Boussingault that barium oxide, when heated a dull red, "absorbs" oxygen, and when heated to higher temperature gave off the absorbed oxygen. This led to the first commercial production of oxygen starting in about 1881 and continuing for about 20 years by the Brin brothers of France. As described in the Brin British patent of 1885, No. 157, they used a three-step process which involved first, the removal of $CO_2$ from air, then passing the dried $CO_2$-free air through or over a retort of baryta (barium oxide, BaO) at a temperature of 500° – 600°C (932°F – 1112°F) to absorb oxygen, and third, the oxygen was withdrawn from the barium oxide by a vacuum creating means. The temperature ordinarily was raised to about 800°C (1,472°F) during the third stage. This gave rise to what is commonly known as the heat cycle variation of the Brin process. A complete cycle took from 3 to 4 hours.

The Jensen British patent of 1880, No. 1416, was another Brin process patent in which compressed air was used in the retorts. This gave rise to the pressure cycle variation of the Brin process. The use of air under pressure apparently ensured a complete and uniform absorption of oxygen in the entire mass of the barium oxide. In this process, the temperature was maintained relatively constant for economic reasons. Although authorities differ as to the exact pressure used, it has been variously reported that the air was forced in at a pressure of from 10 to 15 pounds or 25 to 30 psia, while the oxygen was drawn off under a vacuum of 13 to 14 pounds or 1 psia. While the cycle time was relatively short, being reported to be on the order of about 10 minutes, the output was low.

More recently, Squires Pat. No. 3,324,654 shows a Brin-type process for the simultaneous production of oxygen and power wherein the compressed air is let down through an expansion turbine to recover energy values in the compressed air. The oxygen absorbing bed is a solid composed of an intimate intermingling of tiny crystallites of barium oxide and magnesium oxide. In the process, the bed must be mixed periodically. The crystallites are prepared from a coprecipitated barium carbonate and magnesium carbonate mixture which is pelletized with active carbon and, optionally, a starch paste binder. These pellets are dried and heated to 1,200°F under a CO atmosphere to decompose the $MgCO_3$ to form MgO, and then further heated to 1,750°F to 1,800°F under $O_2$, $CO_2$ and $H_2O$-free conditions to "react" the carbon with the $BaCO_3$. Any excess carbon is burned away by exposing the hot solid to a low concentration $O_2$ stream.

In a recent publication, Moriarty, John L., Jr., *The Effects of Catalytic or Promotor Oxides on The Brin Process*, Proc. Iowa Acad. Sci. 77, 360–78, Apr. 10, 1971, the influence of eighteen oxides as reaction promotors was studied and the results of forty admixture experiments (apparently binary mixtures) were evaluated. The experimental evidence reported there by Moriarty led him to state that it "supports the conclusion that the reversible $BaO$-$BaO_2$ reaction is not, in general, substantially improved by the employment of foreign oxide additions." BaO was mixed, in several types of preparations, with the following oxides: $La_2O_3$, MgO, $Fe_2O_3$, CoO, CuO, CdO, $SiO_2$, $CeO_2$, $Al_2O_3$, ZnO, NiO, CaO, SrO, $Ag_2O$, $MnO_2$, PbO, HgO, and $Na_2O_2$. Moriarty reported that $La_2O_3$ and MgO increase the oxygen yield rate when mixed with BaO, but that the physical arrangement of reaction bed and rapid evacuation procedures appeared critical.

We have set forth in our co-pending applications, Ser. Nos. 242,153 and 241,957, both filed Apr. 7, 1972, (now U.S. Pat. No. 3,773,680) our discovery of new oxygen acceptor compositions and method of their use and manufacture. These compositions employ $BaO_2$ in conjunction with CaO and MgO-containing solids, such as dolomitic quicklime (hereinafter DQL). Such compounds show increased and unexpected results when used in chemical-type oxygen production and enriching processes. Those compositions and methods for their production are not per se part of this invention, and accordingly the subject matter of those applications is enclosed herewith by reference for such details.

Relatively small increases in the oxygen content of combustion air substantially increase flame temperature, burning velocity, combustion limits, and the net heat available per unit of fuel burned in combustion processes. For example, in the burning of natural gas, a significant increase in overall fuel efficiency can be realized by using oxygen-enriched air for combustion operations.

In the glass industry, higher melting rates, and hence higher production rates can be achieved by increasing the temperature of the glass bath. The use of enriched air to achieve this goal can offset the growing use of electricity to attain the high temperatures necessary for efficient operation.

The use of natural gas in blast-furnace operations permits a reduction in the amount of coke required if the blast air is enriched with oxygen. The amount of coke used can be reduced 3 – 4 percent for each 1 percent of natural gas injected into the enriched blast air. Likewise, the production of refractory materials, the refining and processing of metals, the manufacture of ceramics, and the use in pollution abatement processes, for example the combustion of municipal refuse or the oxygenation of sewage, are just a few other uses for oxygen-enriched air.

Conversely, there is a need for oxygen-lean air which is relatively rich in recoverable nitrogen values. For example, steel making processes employ inert gases in soaking pits and the like. One method is to burn the oxygen in air followed by recovery of nitrogen from the combustion gases.

At present, the major source of oxygen and enriched air is from mechanical-cryogenic processes. The cost of the oxygen enriched air is so high in these processes that there is realized only a small potential of the total areas of use of oxygen-enriched air. Since about 1,900, chemical processes for enriching air in accordance with the Brin-type processes have been economically unfeasible, and are today merely laboratory curiosities.

THE INVENTION

Objects

It is among the objects of this invention to provide a chemical process for production of oxygen and enriching air with oxygen which is commercially feasible and economical, and apparatus for carrying out the process.

It is another object of this invention to provide a substantially adiabatic process for the production of oxygen by the use of oxygen acceptor materials in a packed bed reactor system.

It is another object of this invention to provide a process and apparatus for the production of oxygen and enrichment of air in a cyclic, 4-step process employing novel oxygen acceptor materials of the type $BaO_2 \cdot MgO \cdot CaO$.

It is another object of this invention to provide a chemical process and apparatus for the production of oxygen or enriched air employing a cycle of pressures wherein the pressure ratio between oxidation and reduction is kept within defined limits.

It is another object of this invention to provide an improved chemical process and apparatus for the production of oxygen and enriched air which may be run co-currently or counter-currently in an upflow or a downflow mode and which may employ a series of reactors in which the cycle is pyramided.

It is another object of this invention to provide an improved process and apparatus for the production of oxygen or enriched air wherein a third compressor and/or special barium oxide guard reactors may be used.

It is another object of this invention to provide an improved chemical process and apparatus for the production of oxygen or enriched air which process is simple of operation, commercially economically feasible, and which shows steady performance over long periods of time with reproducible results.

It is another object to provide a method and apparatus for providing a portion of the compression energy requirements for chemical processes employing compressed air.

Still other objects of this invention will be evident from the following detailed description.

THE FIGURES

The invention is described below in more detail with reference to the following figures in which like numbers are used for the same or similar elements.

SUMMARY OF THE INVENTION

The process of this invention involves a 4-step cyclic operation under substantially adiabatic conditions utilizing special oxygen-accepting solids of $BaO_2 \cdot MgO \cdot CaO$. The compositions employed are not per se a part of this invention and are disclosed and claimed in our co-pending application Ser. Nos. 242,153 and 241,957, both filed on Apr. 7, 1972 (now U.S. Pat. No. 3,773,680).

Contemporaneously with our discoveries which underlie our co-pending applications, we have developed a cyclic pressure process for reversibly oxidizing the oxygen acceptor compositions to produce oxygen or enriched air having an oxygen concentration in the range of from about 22 – 75 mole percent. We also simultaneously produce a lean air product gas having only from 3 – 15 mole percent oxygen which may be used for its nitrogen values.

The 4-step cycle involves the oxidation of the solids at high pressure, followed by depressurization, reduction and pressurization. Thereafter the cycle is continuously repeated. Within a temperature range of from 1,250° – 1,600°F, preferably 1,350° – 1,500°F, the process is substantially isothermal, that is, is operated at a given bed temperature within the range of ±80°. Pressure during the oxidation ranges from about 14 psia to 385 psia, preferably 21 – 150 psia, and during reduction from 1 – 45 psia, preferably 7 – 45 psia. In addition to the pressure in both oxidation and reduction being kept within the above limits, there is a defined range of pressure ratios which must be observed. Thus, the ratio of pressure in oxidation to pressure during reduction (both expressed in psia) must be kept within the range of 1.6 – 15, and preferably within the range of 2.5 – 8.

The half-cycle times, that is, the time the reactors containing the oxygen-absorbing compounds are either in an oxidizing or reducing mode, ranges from 30 – 360 seconds, and preferably 60 – 180 seconds. The half-cycle time exclude the time involved in the pressurizing and depressurizing stages of the operation. The space velocities involved in our process range from 200 – 5,000 SCF/cu. ft. bed-hour, more preferably 700 – 2,000 SCF/cu. ft. bed-hour. The enriched air ranges from 22 – 75 percent oxygen, preferably 30 – 65 percent, while the lean air ranges from 3 – 15 percent oxygen, preferably 8 – 12 percent.

The process may be operated in either an upflow or downflow mode, and the flow of gases during reduction as compared to oxidation may either flow co-currently or counter-currently. Counter-current mode of operation is presently preferred with downflow during reduction.

Standard means for drying the air and removing carbon dioxide to levels of about 10 ppm $H_2O$ and $CO_2$ are employed.

Important options which may be used in connection with our process include supplying some of the compression energy requirements by burning fuel with the exhausting lean air, to which a portion of inlet compressed air may be passed directly to supply additional moles of gas to an energy recovery expander or turbine. Another option involves pyramiding the cycle. That is, a fraction of the depressurizing air first coming off the pressurized reactor at the end of the oxidation portion of the cycle may be used to pressurize, in part, another reactor. A third important option is the use of a third compressor downstream of the reactors to assist in pulling off the enriched air product gas or oxygen. A fourth important option is the use of a BaO guard reactor which is disposed between conventional $CO_2$ and $H_2O$ removal means and the reactors containing oxygen acceptor bed material. This special guard reactor not only acts as a safety feature but also removes residual water and $CO_2$ from the 10 ppm level in the air drying means down to substantially 0 ppm.

The valving and timing of operation of our process may be adjusted within broad limits to pull off any desired fraction of the enriched air product. Thus, for example, an average product containing about 31 percent oxygen may be produced. In the alternative, specific, predetermined or desired fractions of gases leaving the reactors during reduction may be selectively bled off. Thus product gases ranging up to 75 mole percent oxygen may be recovered. In addition, a vacuum means may be employed to produce substantially pure oxygen if desired. Start up and shut down should be done with the barium in the peroxide state. No rabbling of the packed bed is required.

DETAILED DESCRIPTION

The following detailed description should be taken as illustrative and not limiting of the scope of the invention. The oxygen acceptor compositions which may be used in accordance with the process of this invention are as set forth in our co-pending applications Ser. Nos. 241,957 (now U.S. Pat. No. 3,812,048) and 242,153 (now U.S. Pat. No. 3,773,680), both filed on Apr. 7, 1972. The examples set forth below in the context of this detailed description have reference to $BaO_2$-DQL acceptor compositions having weight ratios of $BaO_2$/DQL in the range of 30/70 - 80/20, in the form of pellets ranging from 1/16 × 1/16 inch to 1 × 1 inch. In accordance with the disclosures in both of the above-identified applications, the carbonate content of the final $BaO_2$-DQL composition is such that the mole ratio of $CO_2$ to $BaO_2$ is less than 1.0.

Figure 1:
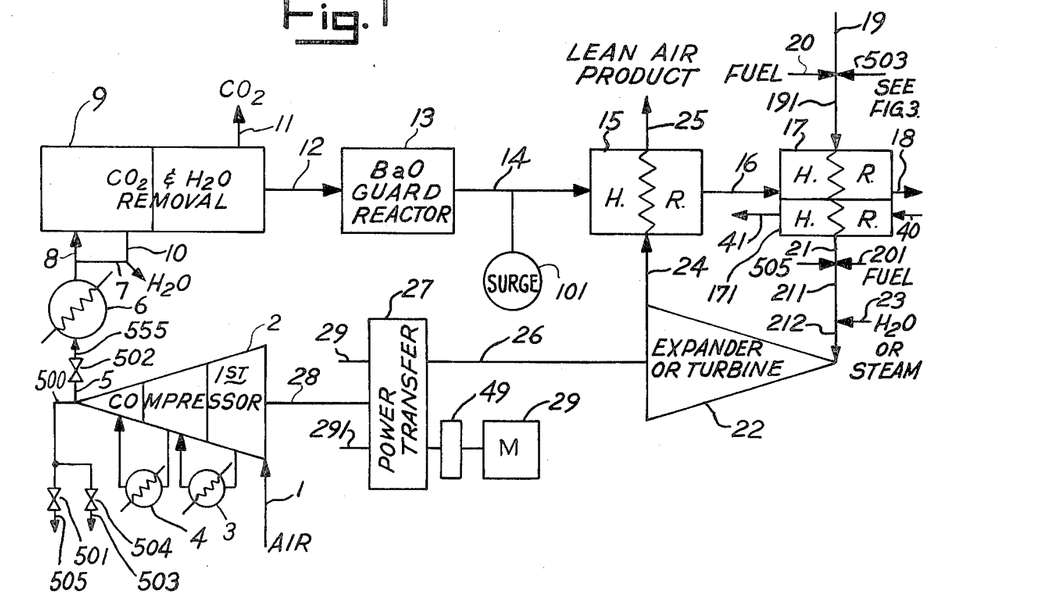
FIG. 1 is a schematic layout of a portion of the process of this invention showing the preparation of the oxidation feed and pressurizing air, and a subsystem for producing some of the compression energy requirements of the process.
Figure 2:
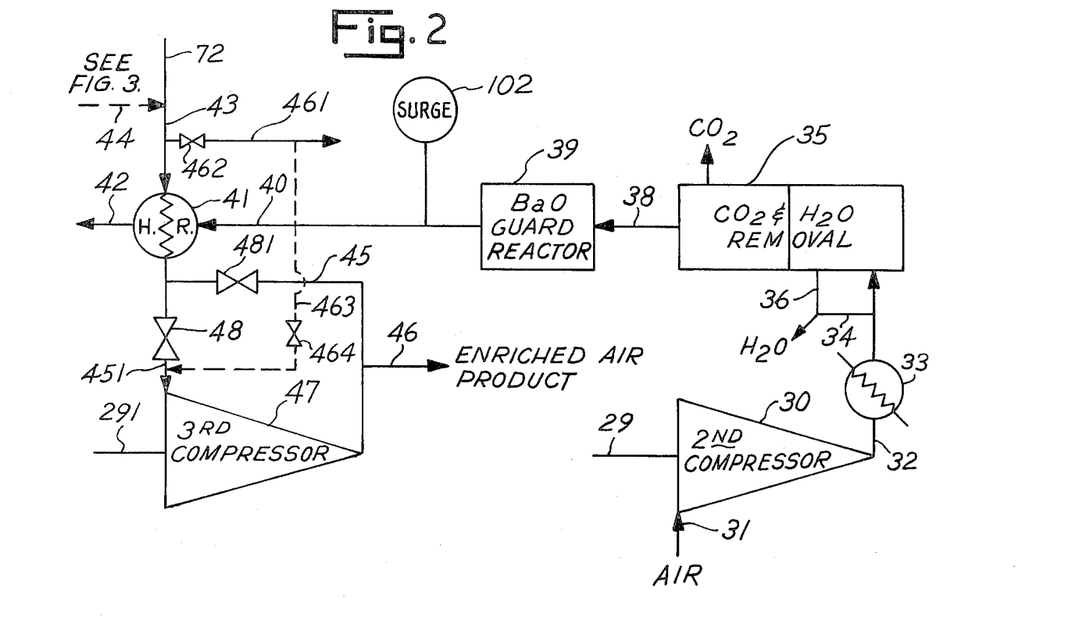
FIG. 2 is a schematic layout of a portion of the process of this invention showing the preparation of the reduction feed air and collection of the enriched air or oxygen product.

Referring now to the figures, FIG. 1 illustrates the preparation of the oxidation and pressurizing feed and the recovery of lean air byproduct. The relationship between FIGS. 1 and 3 can be seen from the fact that the upper right-hand portion of FIG. 1 connects with the lower left-hand portion of FIG. 3. Likewise, FIG. 2 shows the preparation of reduction feed air and the recovery of product gases. FIG. 2 relates to the reactor schematic of the FIG. 3 as seen by the fact that the upper left-hand portion of FIG. 2 connects with the lower right-hand portion of FIG. 3.

Returning now to FIG. 1, ambient air is drawn in through line 1 and passed into a 3-stage compressor 2 where the air is compressed from ambient atmospheric pressure up to from 14 – 385 psia, preferably 21 – 150 psia. As shown by water coolers 3 and 4, there may be intercooling between stages of the first compressor 2 after start-up. The compressed air is passed through line 5, valve 502 and line 555 to cooler 6 wherein the heat of compression of the air is removed. At the same time, some water vapor present in the air may be condensed and drawn off line 7. The partially dewatered compressed air is then passed via line 8 into $CO_2$ and $H_2O$-removal means 9 wherein water is removed via line 10 and $CO_2$ via line 11. Conventional drying and $CO_2$ removal means may be used in this portion of the apparatus. For example, silica gel, activated alumina, or molecular sieves may be used to dry the air down to a value of about 10 ppm. The drying should preferably occur prior to the removal of $CO_2$. For the $CO_2$ removal, Na OH pellets, or calcined limestone or dolomite may be used. We prefer to use a combined removal medium which both dries and removes $CO_2$. Our preferred material is a molecular sieve of the type identified as 13X made by the Linde Division of Union Carbide Corp. which material may be regenerated from time to time as needed.

Figure 3:
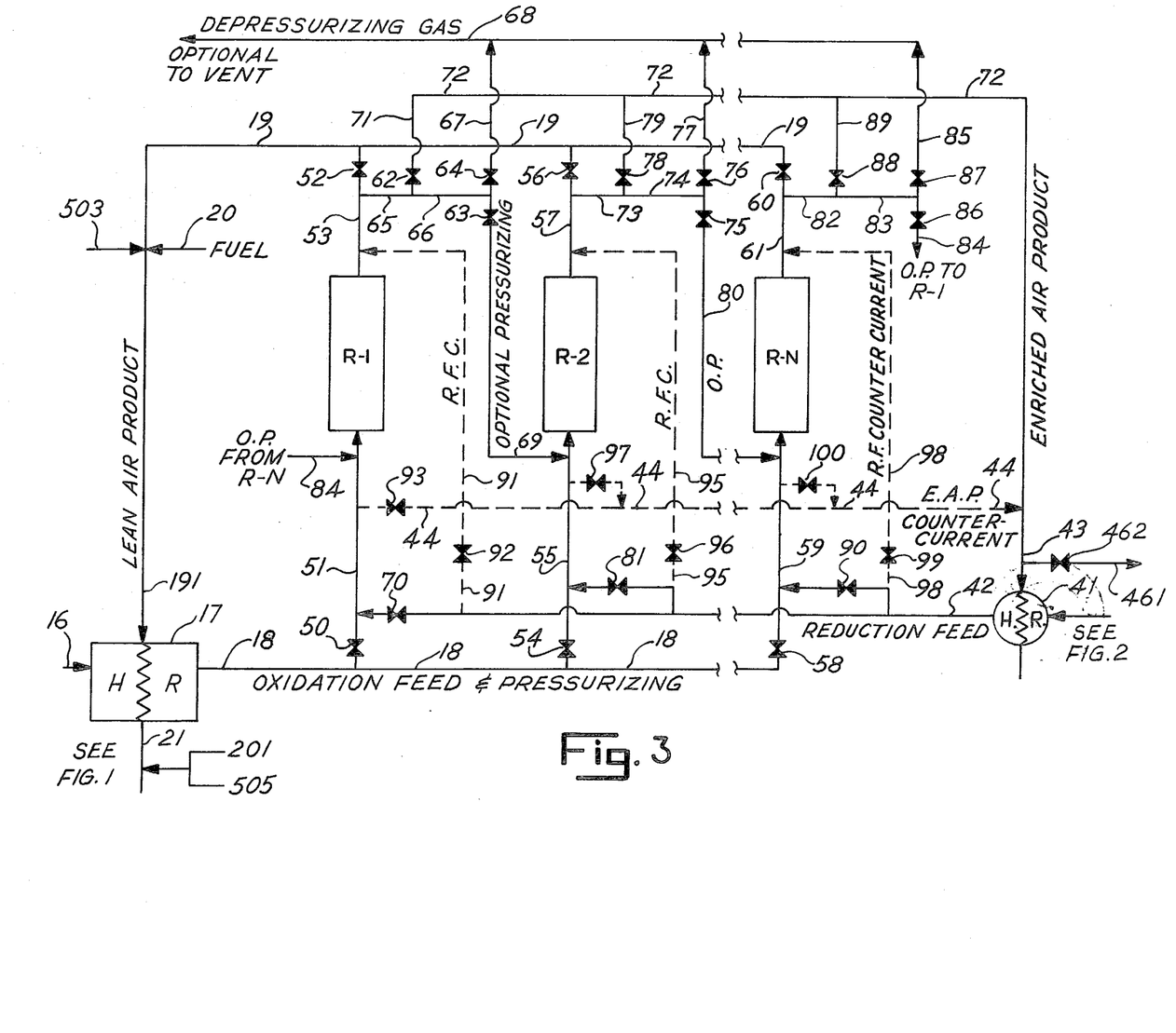
FIG. 3 is a schematic diagram of a portion of the process of this invention showing the reactors and their interrelationship for the steps of the cycle.

The compressed air in line 12 is typically relatively cool, and contains only about 10 ppm each of $CO_2$ and $H_2O$. In a preferred embodiment of this process, the compressed air is passed through a guard reactor containing barium monoxide. This guard reactor serves two functions, first to prevent breakthrough of $CO_2$ and $H_2O$ to the main reactors $R_1$, $R_2$... $R_n$ as shown in FIG. 3. It is extremely important to the operation of our process that both the $CO_2$ and $H_2O$ content of the air passing into the reactors be kept at very low levels. The barium oxides in the main reactors $R_1$, $R_2$... $R_n$ are the actual oxygen-accepting portion of the bed materials. However, these barium oxides are extremely sensitive to both $CO_2$ and $H_2O$ which can, in even low concentrations entirely deactivate the bed material. We have discovered that BaO provides an extremely good guard material for preventing breakthrough of deactivating concentrations of $CO_2$ and $H_2O$ to the main reactors.

In addition, the BaO can be used to scavenge the remaining 10 ppm of $CO_2$ and $H_2O$ from the gases in line 12 to produce a substantially $CO_2$-free and $H_2O$-free gas in line 14. The BaO in the guard reactor can be regenerated from time to time by calcining at temperatures on the order of 1,600° – 2,000°F. The BaO used in the guard reactor should initially be free from water and carbon dioxide so that it may function as a guard material for the main reactors. This can be ascertained by assay of the BaO material used in the reactor. The BaO may be used in powdered, lump, or pellet form. Pellets can be prepared from BaO powder by dry pelletizing.

The relatively cool, $CO_2$—$H_2O$—free air passes through line 14, which may contain a surge means, such as tank 101 to compensate for pressure variations in the system. The $CO_2$ and $H_2O$-free air is then passed through a heat recovery means 15 wherein heat is transferred to the air. The resulting first-stage heated air in line 16 is passed through second heat recovery means 17 wherein the gases are heated to substantially the oxidation temperature range desired in the reactors $R_1$, $R_2$ ... R –of from 1,250°– 1,600°F or above. The heated, compressed air which is substantially free of $CO_2$ and $H_2O$ in line 18 is then passed to the reactors as seen in FIG. 3 as the oxidation feed or pressurizing air. After passing through the reactors as described below in more detail, lean air product gases in line 19 are passed back through the heat recovery means 17 to transfer heat to the feed air in line 16.

Fuel may be added via line 20 to raise the temperature of the lean air stream 19 to about 1,800°F at 191 to increase the efficiency of the heat recovery means 17 for transfer of heat to gas in line 16. Fuel gas such as natural gas also may be added via line 201 to the lean gas in line 21 to supply additional energy values for recovery in expander or turbine 22. When the temperature of the gases in line 212 are required to be kept within the operating temperature limits of the expander 22, or when added moles of gases are needed, water or steam may be added through line 23. The lean air, after having passed through the expander or turbine 22 wherein it gives up its energy and reduces its pressure back to substantially atmospheric, passes through heat recovery means 15 via line 24. The cooled, lean air by-product gases in line 25 may be vented to the atmosphere or, perferably, the nitrogen values are recovered by conventional processes (not shown).

The energy from expander 22 is tranferred by shaft 26 to a power transfer means 27 and shaft 28 to the first compressor 2. The power transfer means may be an appropriate gear box. Optionally, additional power as required to operate the first compressor 2 can be supplied by motor 29 via clutch 49. The motor may be used alone or in conjunction with the power transfer means 27. Power to compressors 30 and 47 (FIG. 2) may also be taken off power transfer means 27 via shafts 29 and 291, respectively.

In an alternate embodiment of the invention, all or a part of the water or steam added in line 23 can be replaced by a bypass bleed of compressed air from compressor 2 via line 500 to either or both lines 19 and 21. For example, valve 501 may be opened to pass high pressure air via lines 500 and 505 to line 21. The fuel in line 201 is burned in the line 211 with the combined lean air from line 21 and the compressed air from line 505. The temperature of gases in line 212 may be adjusted by input of water or steam through line 23, if need be. In the alternative to in-line combustion, the inputs of compressed air line 505 and fuel line 201 may be directly into the turbine 22 for combustion therein. Further, valve 504 may be opened to bleed compressed air via line 503 to line 19 for combustion in line 191 with fuel from line 20 and lean air from line 19. This provides added heat for recovery in heat recovery means 17 and added energy for recovery in expander or turbine 22.

This alternative bypass of compressed air via line 500 to lines 19 and/or 21 is particularly useful for start-up of the system, and may permit reduction in the horsepower requirements of the start-up motors. For start-up, valve 502 may be partly or entirely closed with the initial output of compressed air from compressor 2 driven initially by motor 29 is passed through bypass loops 500 – 503 – 505 – 19 – 21 to the expander or turbine 22 for development of assist power for distribution via power transfer means 27 back to the compressor 2, as needed. As the pressure in the bypass loop builds up, valve 502 may be gradually opened to bring the reactor portion of the system on stream, with power transferred to compressors 30 and 47. It is preferred for initial start-up to use bypass line 505 until some compressed air is bled via valve 502 into line 555, whereupon bypass line 503 and fuel from line 20 may be burned in line 191 to provide heat to bring the reactors to on stream temperature.

For example, each compressor 2 requires 1.17 hp. to compress one mole of inlet air, and expander or turbine 22 produces 1.54 hp. per mole of 1,250°F hot gas expanded. However, when on stream, the lean air in line 19 is mole deficient since oxygen has been removed in the reactors $R_1$, $R_2$, ... $R_n$. Some of the molar deficiency can be made up by increase in the temperature or amount of the lean gas. To run compressor 30, more energy is required than is available from the 1.54 hp./mole hot gas passing through turbine 22. Some of this needed horsepower can be made up by using additional compressed air from compressor 2 via bypass 500 and fuel in line 201. For example, for a typical system of our invention requiring 17,400 overall horsepower (compressors 2 and 30, and expander 22), 9.0 moles of air would be required from compressor 2 to be bypassed via line 500 for each ton of oxygen produced per day, where the turbine or expander 22 operates at 1,250°F. Similarly, for 1,450°F turbine operation, 0.55 moles per ton oxygen produced per day must be bypassed, and this system goes net energy ahead above 1,470°F. To illustrate the advantage of our third compressor embodiment, use of compressor 47 in our system as a "vacuum pump" to pull product gas from the reactors reduces by about 5–10 percent the overall horsepower required, and therefore the bypass moles required and the temperature at which the system goes net energy ahead. In the above bypass alternative, use of steam and/or water through line 23 is not required as a source of make-up moles, but may be employed if desired.

As noted above, the hot $CO_2$ and $H_2O$-free oxidation feed air in line 18 is passed through the main reactors for the oxidation half of the cycle in which each molecule of reacting barium monoxide combines with one-half a molecule of oxygen to produce a molecule of barium peroxide. The oxidation step is exothermic, releasing 58,160 Btu/mole of oxygen accepted. Because of the release of heat during oxidation, and the corresponding absorption of heat during the reduction of the $BaO_2$ to BaO with release of oxygen, the cyclic addition and removal of heat from the system has heretofore presented problems which rendered chemical processes, such as the Brin process, impractical to operate commercially. It is difficult to monitor and change the temperature of the entire reactive system alternately between a high and a low temperature at constant pressures so that the oxidation occurs at low temperature and the reduction at high temperature. To overcome this problem, we employ a process in which the pressure is alternately varied at substantially constant temperature.

In our process, the oxidation occurs at the higher pressure level and the reduction at the low pressure level. In order to make our process and system operate economically, we operate substantially adiabatically with respect to the reactors so that the heat released during the oxidation is stored within our bed material in the system, and later released at the lower pressure during the reduction. This heat is almost entirely stored in the bed by means of the MgO-CaO component of the bed. This permits the bed to produce more oxygen for a given temperature change, $\Delta T$, within the bed. For example, using DQL we can obtain three times the conversion of pure BaO within the same $\Delta T$.

Thus, the temperature of our system is simply maintained by maintaining the sensible heat contained in the feed gases. This heat is very small compared to the heat of reaction noted above, being only that amount necessary to supply the heat losses to the surroundings and the sensible heat in the effluent gases. This can be monitored by thermocouples implanted in the bed, or alternately by monitoring the temperature of the effluent gases.

In cyclic operation to enrich air by cyclic pressurization of a bed of oxygen-accepting compounds, the amount of oxygen added to the solids during oxidation at high pressure must equal the amount of oxygen removed during the reduction. Since the air used in oxidation exits lean in oxygen and the reduction air becomes enriched in oxygen, either the flow rate or the pressure must be balanced. If high flow rates are used, the concentrations of the exit stream gases are only slightly different from each other and from 21 percent oxygen in normal air. Under such conditions, a small pressure difference can be used in the oxidation half of the cycle as compared to the reduction half of the cycle. However, high flow rates require high horsepower. In the other alternative, use of low flow rates results in greater differences in the oxygen concentration of the lean air and the enriched product air. However, this requires large pressure differences, which in turn results in high horsepower needs.

We have discovered that a critical ratio of oxidation pressure to reduction pressure, in the range of about 1.6 – 15, preferably 2.5 – 8, may be used in our process to produce an enriched air stream having substantial amounts of oxygen while rendering the process commercially economically operable in terms of power consumption. We have also discovered that the presence of a third compressor on the downstream side of the reactors to assist in pulling the enriched air product from the system will assist in an overall minimization of the horsepower requirements of the entire process.

Turning now to FIG. 2, this figure illustrates the preparation of the reduction feed air and the removal and collection of product gases such as oxygen or enriched air. Ambient air is drawn into second compressor 30 via line 31 wherein the air is "compressed" in a single stage to a reduction feed pressure up to about 45 psia. The compressed air is passed via line 32 through a cooler 33. Water condensate is drawn off by line 34 and the compressed air is passed into $CO_2$ and $H_2O$ removal means 35, which operates the same as removal means 9 abovedescribed. Thereafter, the air in line 38 at about 10 ppm $CO_2$ and $H_2O$ passes into BaO guard reactor 39 as above-described with respect to guard reactor 13. The compressed, dried and $CO_2$-free air in line 40 is passed through a heat recovery means 41 wherein it is heated and is ready for passing into the reactors via line 42 during the reduction portion of the cycle. A surge tank 102 may be connected in the system, preferably to line 40 as shown, to help compensate for pressure variations in the system arising from the timing of the valve openings and closings. Optionally, line 40 may be enlarged, rather than have a separate tank 102.

Heat is recovered in the heat recovery means 41 from product gases in lines, 43, 44 or 72. The concentration of oxygen in these lines may vary from 22 – 75 percent, typically, from 30 – 65 percent, or may be pure oxygen. After passing through the heat regenerator 41, the enriched air product gas may be removed directly via lines 45, 46, or passed through a third "compressor" 47 via line 451. Valves 48 and 481 control the air flow path either through line 45 or compressor 47, with power for the third compressor being supplied from power transfer means 27 (FIG. 1) via shaft 291.

Some industrial processes employ, or could advantageously employ, hot enriched air or oxygen as a reactant or processing gas. A valuable alternative of our process is that it can directly supply a hot oxygen-containing gas by draw off line 461 via valve 462, upstream of the heat recovery means 41. In this alternative, to supply sufficient heat to the reduction inlet air in line 40, heat exchange with the lean air in line 19 may be arranged. For example, FIG. 1 illustrates heat exchange of air in line 40 in heat recovery means 171 to produce hot reduction feed air in line 41. Where pure oxygen is produced, the hot oxygen may be taken directly off line 461 without need of the heat exchange of a feed air in heat recovery means 41 or 171. Heat recovery means 171 may be a part of, or separate from, heat recovery means 17 and/or 41. The hot product gas in line 461 may be drawn off by the third compressor 47 via line 463 and valve 464 (shown in dashed lines), and thence through line 46.

FIG. 3 shows main reactors $R_1, R_2, \ldots R_n$ in various modes of operation. While the process may be operated with one reactor, we prefer to operate the process with a plurality of reactors to assist in process dynamics and economics. In operation, the hot compressed air in line 18 from which the $CO_2$ and $H_2O$ have been removed passes into reactor $R_1$ via valve 50 and line 51. The valve is in its open position. The reactor $R_1$ is gradually pressurized up to its oxidation pressure of from 14 – 385 psia, preferably 21 – 150 psia. At the end of the pressurizing portion of the cycle, valve 52 is opened and the feed air is permitted to flow through the reactor $R_1$ at a controlled rate to provide a space velocity on the order of 200 – 5,000, preferably 700 – 2,000 SCF/cu. ft. bed-hr. during which time the BaO is oxidized to $BaO_2$ with release of heat and depletion of the oxygen content of the air.

The reactors $R_1$, $R_2$... $R_n$ are typically steel-walled reactors of any appropriate configuration for supporting a packed bed of oxygen accepting pellets, and are insulated to prevent loss of heat through their walls. The gases flowing out of the reactor via outlet line 53 and outlet valve 52 pass through the line 19, the heat recovery means 17, expander 22, and heat recovery means 15 as above described. These gases may be a lean air product having from 5 – 15 percent oxygen, preferably 8 – 12 percent oxygen.

A portion of the overall cycle during which oxidation occurs is termed a half-cycle and may be from 30 seconds to 360 seconds, preferably from 60 seconds through 180 seconds. The pressurizing time is not included in this half cycle. At the end of this half cycle, valve 50 is closed, and the inlet valve 54 for reactor $R_2$ is then opened for pressurization of reactor $R_2$ via the inlet line 55. The outlet valve 56 from reactor $R_2$ is closed thus preventing escape of gases through outlet line 57. Upon completion of pressurization of reactor $R_2$, valve 56 opens permitting oxidation of the solids in reactor $R_2$ by passage therethrough of the oxidation feed air and exhausting of the lean air product via line 19. During this time reactor $R_1$ is on another portion of its cycle and accordingly its outlet valve 52 is closed thus preventing back pressure from reactor $R_2$ passing into reactor $R_1$.

Once the reactor $R_2$ has completed the oxidation half of its cycle, the inlet valve 54 is closed and the inlet valve of the next reactor in the series is opened for pressurization and oxidation of that next reactor. For purposes of illustration, this is shown as reactor $R_n$, which is meant to be generic with respect to the $n^{th}$ reactor. For purposes of illustration, that is shown here as a third reactor, but could be the fifth, tenth, or one-hundredth reactor as the case may be. As before, the $n^{th}$ reactor inlet valve 58 is opened for pressurization and oxidation of the reactor via line 59. Valve 60 remains closed until the pressurization portion of the cycle is completed, whereupon that valve opens and the lean air can flow from the reactor via line 61 to the lean air product collection line 19.

After the pressurization and oxidation of a given reactor, such as $R_1$, has been finished, the reactor must go through a third, depressurizing stage of the cycle. One manner of providing for this depressurization is to close the valves 50, 52, 62 and 63 (the latter two valves being described in more detail below), and to open depressurizing gas valve 64. This permits the pressure in reactor $R_1$ to be relieved via lines 53, 65, 66, 67 and 68 whereby the gas may be vented to the atmosphere. It will be recalled that the oxidation occurs at relatively higher pressure than the reduction. The depressurization of the reactor thus permits the reactor $R_1$ to be ready for the reduction mode. This depressurizing portion of the cycle may be controlled and maintained within relatively broad limits, from a few seconds to a few minutes as desired. It is preferred that the depressurization be regulated at a rate such that the gases leave the reactor bed in the oxidized state at the normal flow rate, that is, the same space velocity as above described for the oxidation and reduction. This will assist in preventing movement of the solids in the bed.

A preferred option in our process is to assist in pressurizing, at least in part, reactor $R_2$ by the depressurizing gas leaving reactor $R_1$. This is accomplished by closing off valves 50, 52, 62 and 64 and opening valve 63 so that a portion of the depressurizing gas leaving reactor $R_1$ via lines 53, 65 and 66 can be passed through valve 63 via line 69 to reactor $R_2$. The entire amount of depressurizing air leaving the reactor $R_1$ need not be vented through valve 63 and line 69 to reactor $R_2$. The reason for this is that the tail end portion of the depressurizing gas leaving the reactor $R_1$ will not have sufficient pressure to fully pressurize the reactor $R_2$. Thus, it would not be possible to pull reactor $R_1$ down to sufficiently low pressure for the reduction to occur in reactor $R_1$. Therefore, after a portion of the depressurizing gas leaving reactor $R_1$ has passed through valve 63 in line 69, valve 63 may be closed and the valve 64 open to permit the remaining gas to vent to the atmosphere.

As a valuable alternative in our process, the remaining gas passing out of reactor $R_1$ during the last portion of depressurizing step of the cycle may be passed downstream to still another reactor so long as that other reactor is at a lower initial pressure. Still another alternative is to vent the first portion of the depressurizing gas of reactor $R_1$ to reactor $R_2$, and collect as product gas via lines 71 and 72a second portion by opening valve 62 and closing valves 50, 52, 63 and 64.

Subsequent to the depressurization of reactor $R_1$, valve 50 is maintained in a closed position, and reduction feed air from line 42 is passed into the reactor $R_1$ via valve 70 and line 51. This then begins the reduction portion of the cycle. Air having a normal amount of oxygen is passed through the reduction feed line 42 after having been prepared in the compressor, $CO_2$ and $H_2O$ removal means, BaO guard reactor, and heat recovery means as described in FIG. 2. This heated gas which is at a pressure within a range of from about 1 – 45 psia, is then continuously passed at the above-described flow rates through the reactor $R_1$ wherein the oxygen acceptor portion of the bed material is in the oxidized state. Valves 52, 63 and 64 remain closed, while enriched product valve 62 is open. This permits gases to flow from the reactor $R_1$ through lines 53, 65 and 71 into the product gases gathering line 72. The oxygen or enriched air product, having from 22 – 75 percent oxygen, preferably from 30 – 65 percent oxygen, then passes through the recovery equipment shown in FIG. 2.

The reduction half cycle may be, in length of time, the same or different than that of the oxidation half cycle. This depends in part upon the working behavior of the particular system, and the oxygen content of the enriched air or oxygen desired to be produced.

After the reduction half cycle step is completed, the reactor $R_1$ then returns to the pressurizing portion of the cycle and the sequence above-described is repeated.

It should be understood that the barium component of the bed material used in this invention should be in the form of barium peroxide upon start up or shutdown of the reactor to minimize deactivating hydration or carbonation of the bed oxygen acceptor materials. Accordingly, upon start-up the first cycle begins with the reduction half-cycle, and then proceeds through pressurization, oxidation and depressurization.

To continue, after the reactor $R_2$ has been pressurized in part either through valve 54 and line 55, or through valve 63 and line 69, this reactor goes through the oxidation half cycle step by feed of air through lines 18 and 55. Thereafter, the reactor $R_2$ may be depressurized through lines 57, 73, 74 and either 77 or 80, depending on whether it is desired to vent the depressurizing gas to the atmosphere or to use a portion of it in reactor $R_n$. Correspondingly, valves 56, 78, and either 75 or 76 are in the closed position, and 76 or 75 are in the open position. If venting to the exterior is desired, valve 75 is closed and 76 is open. If pressurization in part of reactor $R_n$ is desired the valve 76 is closed and valve 75 is open.

After depressurization, the reduction portion of the cycle commences with reduction feed air passing from line 42 through valve 81 and line 55 into the reactor $R_2$. The valve 70 leading to reactor $R_1$ is closed. Likewise, the lean air product valve 56, and the depressurizing valves 75 and 76 are closed while the enriched air product valve 78 is open. This permits withdrawing the enriched air product from the reactor $R_2$ via lines 57, 73 and 79 to the enriched air product gathering line 72.

Upon completion of the reduction portion of the cycle, the reactor $R_2$ is repressurized by closing valves 81, 56, 78, 75 and 76. The reactor $R_2$ is then repressurized by pressurizing feed air passing through the valve 54 and line 55, or optionally repressurized in part via line 69 from reactor $R_1$. The remaining pressurization occurs through valve 54 in line 55 by the pressurizing gas feed. The cycle is repeated as above-described.

The sequence of the four steps in the cycle is then continuously repeated for each reactor in sequence down the line until reactor $R_n$ is reached. After completion of the oxidation portion of the cycle of reactor $R_n$ by passing the oxidation feed gas through valve 58 and line 59 with the lean gas passing off through lines 61 and 19 via valve 60, the reactor is permitted to depressurize through lines 61, 82, 83 and either 84 or 85. The valves 60 and 88 remain closed, while valve 86 is open and valve 87 is closed if it is desired to optionally pressurize another reactor through line 84. If it is desired to vent all or a portion of this depressurizing gas from reactor $R_n$ to the atmosphere, then valve 86 is closed and valve 87 is open. As seen by comparing line 84 coming off from the upper portion of reactor $R_n$ via lines 61, 82 and 83, with the same numbered line at the lower left portion of reactor $R_1$, the system is completed by permitting optional pressurization of reactor $R_1$ by feed through line 84 from reactor $R_n$.

After the depressurizing portion of the cycle, valves 58, 60, 86 and 87 are closed, and reduction feed air is passed through line 42, valve 90 and line 59 into the reactor $R_n$ to effect the reduction half-cycle step. The gas is collected by passing it through lines 61, 82 and 89 to the collection manifold line 72. Valve 88 remains open during this portion of the cycle. The enriched air product is then passed through line 43 and collected as desired in accordance with the description above in connection with FIG. 2.

The description above of FIG. 3 has illustrated an upflow system with co-current flow of the oxidation and reduction feed gases. However, it should be understood that the preferred mode of operation is a downflow system. Thus, it must be appreciated that up and down in FIG. 3 is merely arbitrary, and the figure equally illustrates our preferred downflow system, e.g., by turning the drawing over.

FIG. 3 also illustrates a counter-current reduction feed and enriched air product collection system in dashed lines. For counter-current operation, rather than feed reactor $R_1$ during the reduction half of the cycle via line 42 and valve 70, the feed occurs via lines 42, 91 and valve 92. The enriched air product is drawn off through valve 93 and line 44. Valve 70 and the portion of the line associated with valve 70 to the left of the tap off of 91 is not present in this alternative.

Likewise, counter-current operation for reactor $R_2$ occurs for reduction through line 95 and its associated valve 96, while the enriched air product is drawn off through valve 97 and line 44. In counter-current operation, reactor $R_n$ would be fed during reduction through line 98 and its valve 99, with the enriched air product being drawn off via valve 100 to collection line 44.

It will be appreciated that the switching of the various valves above described can be timed by one skilled in the art to provide for continuous and optimum operation. This is facilitated by having a plurality of reactors and surge tanks or lines so that the compressors may run continuously without having to vent compressed gas to the atmosphere while waiting for one of the reactors to cycle to a desired step of the reaction cycle. The space velocity and cycle time should likewise be selected so that the given reactor bed is switched to reduction just as the peak of the reaction front arrives at the end of the bed.

For oxygen production, the above process is modified as follows in the reduction half of the cycle. After oxidation of reactor $R_1$ is complete valves 50, 52, and either 63 or 64 are closed. The reactor then depressurizes through either line 67 or 69 as desired. After partial or full depressurization, valves 63 and/or 64 are closed and valve 62 opened. Valve 70 remains closed so there is no reduction factor. Compressor 47, acting as a vacuum pump, then pulls reactor $R_1$ pressure below atmospheric, 15 psia, and oxygen is evolved from the $BaO_2$ in the bed. The oxygen may be collected hot or cooled as above described with reference to FIG. 2.

ILLUSTRATIVE EXAMPLES

Figure 4:
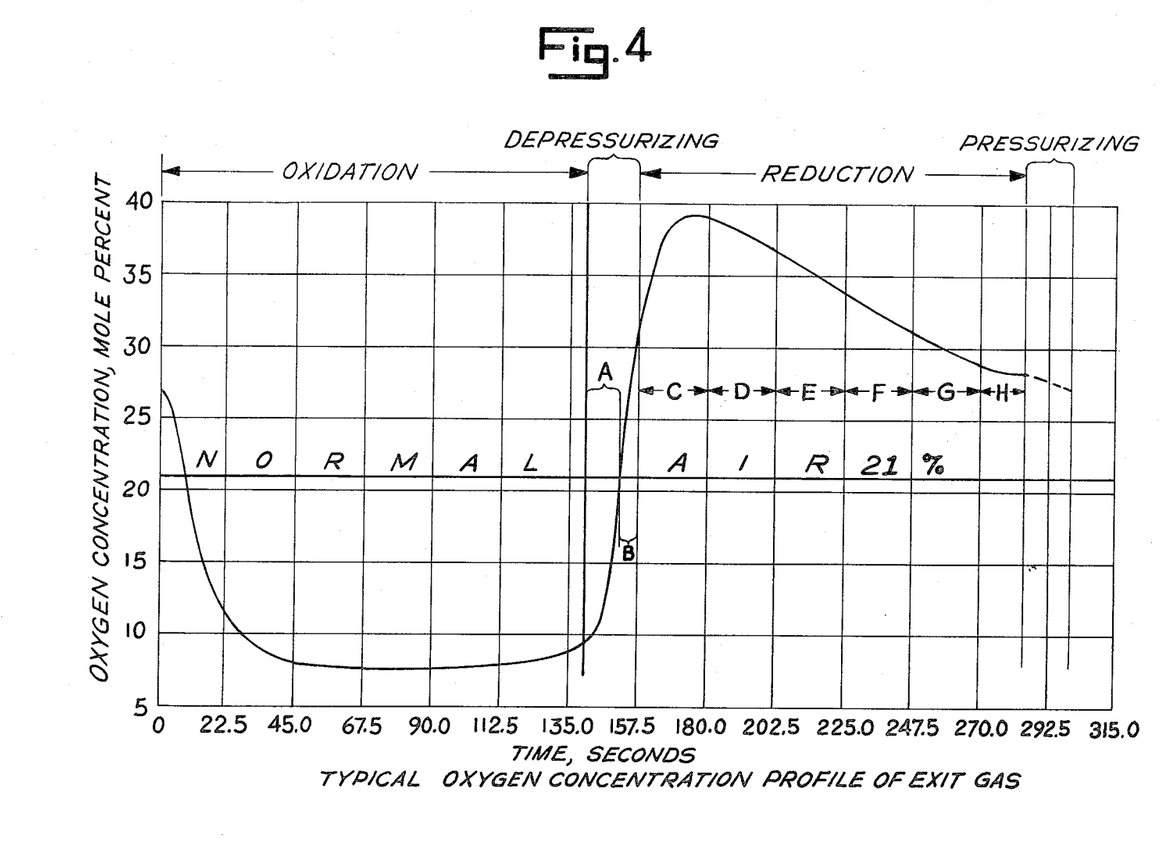
FIG. 4 illustrates a typical oxygen concentration profile of the exit gas during operation of the process of this invention as a plot of oxygen concentration versus time.

The following example has reference to FIG. 4 which shows a typical oxygen concentration profile of exit gas from a single pilot plant reactor wherein the oxygen concentration in mole percent of the exit gas leaving the reactor is plotted against the time for a single complete cycle. The cycle shown in FIG. 4 is representative of the cyclic operation of our process although it should be understood that the precise shape of the curve obtained is neither critical nor limiting of our process.

Feed air for this example was supplied by two air compressors (a Gardner Denver Model A.B.E. 1003 along with a Joy Model S.C. -364-5) used in series to compress the feed air to 125 psig. The compressed air was cooled in a knockout tank, which removes the bulk of water released during the compression. The air from the knockout tank was then passed through a Pall mechanical filter in which additional water contained in the air as mist was removed. This compressed air was then passed through a Sahara regenerative air drier, Model RG 450 which contains 600 lbs. of 1/16-inch type 13X Linde molecular sieve. The molecular sieve reduces both the $CO_2$ and $H_2O$ concentrations in the air to below about 10 ppm. The $CO_2$ concentration in the air was continuously and automatically monitored and recorded with a Lira Model 200 MSA infra-red analyzer and a Brown multipoint recorder. This partially-dried compressed air flows through a special guard reactor containing 50 lbs. of BaO which operates to reduce both the $CO_2$ and water concentration in the air from about 10 to about 0 ppm. The dried, $CO_2$-free air then flows through a controller which maintains the air at a constant pressure at the metering orifice. The rate of air fed to the reactor is determined by the pressure drop across this orifice and by the pressure and temperature of the gas at the inlet of the orifice. These are recorded continuously using a differential pressure transmitter and a circular chart recorder. Two parallel piping systems downstream of the orifice were used, one for low pressure during the reduction part of the cycle and the other for high pressure feed gas during oxidation. Electrically activated, pneumatically operated solenoid valves were used to divert the flow through the appropriate system at the appropriate time during the cycle. The gas flow in each system was controlled by preset flow control valves. The oxidation and reduction times were controlled by a camshaft timer which activated the appropriate solenoids to control pressurization, oxidation, depressurization, and reduction time.

The feed air was then heated from room temperature to the appropriate temperature. In pilot plant operation, we used a gas-fired, brick-line furnace but it should be understood that during commercial operation, a portion of the heat would be recovered from the exit gases as above-described. The transfer pipe to the reactor was insulated and electrically heated to compensate for heat losses between the heat transfer means and the reactor. This piping was separated into two systems, one for oxidation and one for reduction. A Kielley and Mueller type 18,508 hot valve was installed in each of the two parallel piping systems for countercurrent operation with gas flow from top to bottom during oxidation and from bottom to top during reduction. Co-current operation was also used. During this latter mode of operation, hot feed gas enters at the top and exits from the bottom of the reactor in both oxidation and reduction.

These gases were then passed into a reactor shell which was a tubular shell of type 316, Schedule 80 stainless steel pipe 88 inches long with a full-opening Grayloc head closure. The reactor, supported by a ¼ inch steel plate table, was set in castable, insulating concrete to reduce the bottom heat losses. A 22 o.d. ⅜ inch thick carbon steel shell surrounds the reactor and acts as a heat shield. Fiberfrax insulation was packed tightly (25 lbs./cu.ft.) between the pressure vessel and the heat shield. Eight electric strip-heaters were evenly spaced around the reactor pressure vessel and heat shield, each being 90 inches long and producing 313 watts at 240 volts. These heaters were used to minimize heat losses from the reactor and promote adiabatic operation. Additional 1 foot thick lightweight Monoblock insulation surrounded the heat shield to reduce heat losses to the environment. Inside the pressure vessel, a 7 ½ foot long 0.104 inch thick, 12 inch o.d. carbon-steel reactor liner contained the solids bed. This liner was insulated from the heavy reactor wall with about 1 inch of Fiberfrax insulation. The liner contained an 81 inch deep bed of oxygen accepting materials which was further isolated at either end with 4 inches of Fiberfrax, 3 inches of Alundum spheres, and 1 inch of ⅛ × ⅛ inch Norton inert support pellets. The instrumentation within the reactor included 23 thermocouples and 9 sample gas taps spaced approximately every 10 inches inside the bed to record temperature changes and oxygen concentrations during operation.

The gas exiting from the reactor was cooled to room temperature in a single-pass, shell-and-tube heat exchanger. The cooled gas flowed either through the oxidation exit piping system or the reduction exit piping system, with each piping system containing a back-pressure regulator preset to control the reactor pressure appropriately for each half-cycle. A bellows-type flow meter of 10,000 CF/hr. capacity was used to measure the exit gas flow from both piping systems.

To initiate operating procedures, the reactor was preheated to approximately 1,000°F. with the electrical heaters surrounding the reactor and heat shield. The tubes for transfer of heat to the feed gases were then preheated and cooling water for the heat exchangers was turned on. The oxygen and $CO_2$ analyzers were calibrated and flow controllers were set before air flow was started. A molecular-sieve air drier was turned on. During this time, the compressors were turned on but feed air bypassed the solids bed to storage tanks. No air was admitted to the BaO guard reactor until the $CO_2$ and water content was reduced to below 10 ppm. The furnace temperature was then increased and the electrical line heaters on the transfer piping between the heat exchangers and the units were turned on. The reactor bed solids were then brought to operating temperature with a flow of high pressure heated air, and the timers were activated to begin cyclic operation. The flow rates were adjusted to final run conditions and the reactor was allowed to reach a dynamic steady state overnight before taking data. Repetitiveness of recorded temperature profiles in the bed and of oxygen concentrations in the exit indicated when steady state operations were achieved. Approximately 30 cycles at steady-state conditions constituted one run. Once the reactor was started, the unit was operated continuously.

The bed material was pelletized barium peroxide with DQL. A 70/30 weight percent mixture of $DQL/BaO_2$ was prepared. The mixture was gravity fed through a funnel to a worm screw feeder which forced the mixture into a set of briquetting rollers, which were 15 inches in diameter, 3 inches wide, and contained 96 pockets. The rollers were operated at 10½ rpm at a total pressure of 35 tons to make 3 × ⅜ inch briquette sticks. The briquette sticks were chopped to a smaller size in a Fitz-mill comminutor operating at 800 rpm. The product was bucket-fed to a portable electric screener that had a 5/16-inch screen for oversize material and a ¼ inch screen for undersize material. The pellets selected for this example were within a ¼ × ¼ inch size range. The undersize material was recycled to the roll-briquetting machine while the oversize material was run through the comminutor again. The prepared bed material was placed into polyethylene-lined 55 gal. drums. Although barium peroxide is not substantially deactivated by ordinary atmospheric moisture and carbon dioxide, polyethylene-lined, sealed drums were used to transport and store the pellets as an ordinary precaution to prevent deactivation of the mixture. The chemical analyses of the DQL and $BaO_2$ used to make the pellets are shown below in Tables 1 and 2.

TABLE 1

CHEMICAL ANALYSIS OF RAW DOLOMITIC QUICKLIME
(Manufacturer's Analysis)

| Component | Composition, wt.% |
|---|---|
| Calcium Oxide (CaO) | 57.66 |
| Magnesium Oxide (MgO) | 41.51 |
| Silicon Dioxide ($SiO_2$) | 0.19 |
| Aluminum Oxide ($Al_2O_3$) | 0.20 |
| Iron Oxide ($Fe_2O_3$) | 0.085 |
| Sulfur (S) | 0.03 |
| Loss on Ignition | 0.35 |

TABLE 2

CHEMICAL ANALYSIS OF RAW BARIUM PEROXIDE
(Manufacturer's Analysis)

| Component | Composition, wt. % |
|---|---|
| Barium Dioxide ($BaO_2$) | 90.3 |
| Insoluble in HCl | 0.06 |
| Chloride (Cl) | 0.005 |
| Unprecipitated by $H_2SO_4$ | 0.21 |
| Heavy Metals as Lead (Pb) | 0.005 |
| Iron (Fe) | 0.01 |

The oxygen concentrations in the effluent stream were continuously measured with a precalibrated Beckman Model F-3 oxygen analyzer. This instrument measures the magnetic susceptibility of the gas sample. Since oxygen is strongly paramagnetic, while other common gases with only a few exceptions are weakly diamagnetic, output readings are proportional to the oxygen concentration. The analyzer was connected to a recorder which continuously recorded the oxygen concentration in the product gas. A typical oxygen concentration profile produced by the recorder is shown in FIG. 4. There is of course a lag time due to the time required for the sample to flow from the sample point to the analyzer. However, since special effort was made to obtain a constant sample flow during both halves of the cycle, the lag time was corrected by merely shifting the concentration curve along the time axis. The curve shown in FIG. 4 has been adjusted for the recorder lag time.

Table 3 below shows the operating parameters for a 30-cycle run taken as typical for operation of the process of this invention, run co-currently with inlet gas flow from top to bottom during both oxidation and reduction. A typical cycle of this run is also illustrated in FIG. 4.

TABLE 3

RESULTS OF RUN

| OPERATING CONDITIONS | |
|---|---|
| Bed Height, ft. | 6.25 |
| Bed Weight, lb. | 412 |
| Pellet Size, in. | ¼ × ¼ |
| Nominal Half-Cycle Time, min. | 2.5 |
| Inlet Flow Rates, SCF/hr. | |
|   Oxidation | 3760 |
|   Reduction | 3340 |
| Space Velocity[a], $hr.^{-1}$ | |
|   Oxidation | 793 |
|   Reduction | 705 |
| Pressure, psia | |
|   Oxidation | 95 |
|   Reduction | 25 |
| Inlet Gas Temperature, °F | 1440 |
| Cycle Duration, sec. | |
|   Oxidation | 142.9 |
|   Depressurization | 15.2 |
|   Reduction | 129.9 |
|   Pressurization | 15.7 |
| Product Gas, SCF | |
|   Oxidation | 125.1 |
|   Depressurization | 15.2 |
|   Reduction | 145.0 |
| Average Oxygen Conc., mol % | |
|   Oxidation | 8.4 |
|   Reduction[b] | 33.0 |
|   Reduction[d] | 33.4 |
| Oxygen Reacted, SCF | |
|   oxidation | 20.5 |
|   Reduction[b] | 24.3 |
|   Reduction[d] | 22.6 |
| Oxygen Balance[c], % | 118.5 |

[a] SCF/hr. of inlet air/bed volume, cu. ft.
[b] Includes depressurization gas.
[c] Oxygen reacted during reduction × 100/oxygen reacted during oxidation.
[d] Excludes depressurization gas.

In other runs, described in more detail below in Table 4, half cycle time was varied from 1.5 – 3.5 min. with space velocity being varied between 660 and 960 $hrs.^{-1}$ for oxidation and between 685 and 940 $hrs.^{-1}$ for the reduction half of the cycle. Oxidation pressure for these additional runs was varied between 85 – 103 psia and reduction pressure from 23 – 31 psia. The inlet gas temperatures were held between 1,430° and 1,515°F. Bed temperature during the adiabatic operation will self-adjust, depending on conversion rates and inlet-feed gas temperatures. The average concentration of oxygen in the product gas range from 7.3 – 13.7 mole percent during oxidation and from 26.3 – 36.7 mole percent during reduction. The results of these 30-cycle downflow, co-current runs are detailed in Table 4 below.

TABLE 4

RESULTS OF EXEMPLARY RUNS
(¼ × ¼" Pellets)

| Run No. | 2 | 3 | 4 | 5 | 6 | 7 | 8 | 9 |
|---|---|---|---|---|---|---|---|---|
| OPERATING CONDITIONS | | | | | | | | |
| Bed Height, ft. | 6.25 | 6.25 | 6.25 | 6.25 | 6.25 | 6.25 | 6.25 | 6.25 |
| Bed Weight, lb. | 412 | 412 | 412 | 412 | 412 | 412 | 412 | 412 |
| Nominal Half-Cycle Time, min. | 2 | 2 | 1.5 | 1.5 | 2.5 | 2.5 | 1.5 | 1.5 |
| Inlet Flow Rates, SCF/hr | | | | | | | | |
|   Oxidation | 4060 | 4060 | 3770 | 3770 | 3810 | 4550 | 4220 | 4170 |
|   Reduction | 3950 | 3950 | 3510 | 3530 | 3470 | 4440 | 4330 | 4320 |
| Space Velocity,[a] $hr^{-1}$ | | | | | | | | |
|   Oxidation | 856 | 856 | 796 | 796 | 804 | 960 | 889 | 880 |
|   Reduction | 834 | 834 | 741 | 745 | 732 | 936 | 914 | 911 |
| Pressure, psia | | | | | | | | |
|   Oxidation | 95 | 94 | 95 | 95 | 95 | 96 | 94 | 94 |
|   Reduction | 26 | 27 | 27 | 27 | 25 | 31 | 30 | 30 |
| Inlet Gas Temp., °F. | 1430 | 1440 | 1440 | 1440 | 1440 | 1440 | 1450 | 1450 |
| Cycle Duration, seconds | | | | | | | | |
|   Oxidation | 111.4 | 106.9 | 81.0 | 84.4 | 141.8 | 140.1 | 83.3 | 86.3 |
|   Depressurization | 13.5 | 14.6 | 14.6 | 15.8 | 15.2 | 14.1 | 16.0 | 15.0 |
|   Reduction | 101.2 | 102.4 | 70.0 | 72.0 | 131.6 | 133.3 | 67.3 | 72.0 |
|   Pressurization | 12.9 | 16.3 | 12.2 | 10.1 | 11.3 | 10.7 | 10.1 | 11.3 |
| OPERATING RESULTS | | | | | | | | |
| Product Gas, SCF | | | | | | | | |
|   Oxidation | 114.0 | 118.7 | 76.5 | 78.2 | 128.9 | 169.0 | 91.1 | 91.5 |

TABLE 4 — Continued

RESULTS OF EXEMPLARY RUNS
(¼ × ¼" Pellets)

| Run No. / OPERATING CONDITIONS | 2 | 3 | 4 | 5 | 6 | 7 | 8 | 9 |
|---|---|---|---|---|---|---|---|---|
| Depressurization | 17.8 | 21.5 | 20.1 | 18.1 | 23.7 | 17.0 | 17.9 | 16.0 |
| Reduction | 120.5 | 121.5 | 81.3 | 81.0 | 145.0 | 183.2 | 91.1 | 92.4 |
| Average Oxygen Conc. mol % | | | | | | | | |
| Oxidation | 13.7 | 12.5 | 8.9 | 9.8 | 8.9 | 13.0 | 10.6 | 11.3 |
| Reduction[b] | 27.2 | 29.3 | 31.4 | 31.8 | 31.7 | 28.2 | 28.6 | 28.6 |
| Reduction[e] | 26.3 | 30.0 | 32.5 | 31.7 | 31.8 | 27.9 | 29.1 | 28.9 |
| Oxygen Reacted, SCF | | | | | | | | |
| Oxidation | 10.6 | 11.6 | 11.3 | 10.9 | 19.9 | 16.2 | 11.3 | 10.9 |
| Reduction[b] | 10.9 | 15.7 | 13.2 | 13.7 | 23.1 | 18.1 | 10.4 | 10.9 |
| Reduction[e] | 8.0 | 14.6 | 11.7 | 11.1 | 20.1 | 15.7 | 9.3 | 9.7 |
| Oxygen Balance,[c] % | 102.8 | 135.3 | 116.8 | 125.7 | 116.1 | 111.7 | 92.0 | 100.0 |
| Bed Height, ft. | 6.25 | 6.25 | 6.25 | 6.25 | 6.75 | 6.75 | 6.75 | |
| Bed Weight, lb. | 412 | 412 | 412 | 412 | 437 | 437 | 437 | |
| Nominal Half-Cycle Time, Min. | 3.5 | 3.5 | 2.5 | 2.5 | 2.5 | 2.5 | 2.5 | |
| Inlet Flow Rates, SCF/hr | | | | | | | | |
| Oxidation | 3820 | 3760 | 3790 | 3790 | 3630[d] | 4690[d] | 3370 | |
| Reduction | 3500 | 3470 | 3470 | 3560 | 3660[d] | 3550[d] | 3500 | |
| Space Velocity,[a] hr⁻¹ | | | | | | | | |
| Oxidation | 805 | 793 | 798 | 798 | 709 | 917 | 659 | |
| Reduction | 738 | 732 | 731 | 750 | 715 | 694 | 684 | |
| Pressure, psia | | | | | | | | |
| Oxidation | 96 | 96 | 85 | 85 | 100 | 103 | 94 | |
| Reduction | 24 | 24 | 25 | 25 | 26 | 25 | 23 | |
| Inlet Gas Temp., °F. | 1440 | 1440 | 1440 | 1440 | 1510 | 1515 | 1470 | |
| Cycle Duration, seconds | | | | | | | | |
| Oxidation | 191.5 | 192.4 | 124.9 | 129.4 | 131.6 | 139.5 | 136.6 | |
| Depressurization | 16.6 | 15.8 | 14.1 | 13.5 | 15.8 | 15.4 | 13.1 | |
| Reduction | 200.3 | 200.3 | 142.3 | 144.0 | 133.9 | 132.8 | 144.0 | |
| Pressurization | 11.3 | 10.7 | 11.3 | 11.3 | 17.4 | 10.1 | 13.5 | |
| OPERATING RESULTS | | | | | | | | |
| Product Gas, SCF | | | | | | | | |
| Oxidation | 178.6 | 177.7 | 117.9 | 115.9 | 113.2 | 156.2 | 113.5 | |
| Depressurization | 17.0 | 15.1 | 13.0 | 13.1 | 13.6 | 18.3 | 18.7 | |
| Reduction | 207.0 | 207.0 | 146.6 | 153.2 | 152.2 | 163.6 | 159.4 | |
| Average Oxygen Conc. mol % | | | | | | | | |
| Oxidation | 12.6 | 12.2 | 11.1 | 11.6 | 7.3 | 7.8 | 8.1 | |
| Reduction[b] | 28.3 | 28.2 | 28.0 | 27.5 | 28.2 | 34.4 | 29.0 | |
| Reduction[e] | 28.0 | 27.9 | 28.7 | 27.4 | 29.4 | 36.7 | 30.7 | |
| Oxygen Reacted, SCF | | | | | | | | |
| Oxidation | 19.3 | 20.0 | 14.6 | 14.4 | 19.7 | 26.1 | 17.8 | |
| Reduction[b] | 21.3 | 21.0 | 14.9 | 14.0 | 15.2 | 30.9 | 18.1 | |
| Reduction[e] | 18.9 | 18.7 | 15.0 | 12.6 | 16.1 | 32.7 | 19.6 | |
| Oxygen Balance,[c]% | 110.4 | 105.0 | 102.0 | 97.2 | 77.2 | 118.4 | 102.8 | |

[a] SCF/hr of inlet air/bed volume, cu. ft.
[b] Includes depressurization gas.
[c] Oxygen reacted during reduction X 100/oxygen reacted during oxidation.
[d] Based on exit flow rates.
[e] Excludes depressurization gas.

In our results, we show the depressurization gas optionally included as part of the reduction cycle. However, in actual operation, the initial portion of this gas contains less than 21 percent oxygen as can be seen from FIG. 4. The concentration of oxygen rises rapidly as the pressure falls below the equilibrium. As above-described, in commercial operation we prefer to discard the initial portion of the depressurizing gas, that is, the portion of the depressurizing step of the cycle as shown in FIG. 4 identified by the letter A. As noted above, this discard could be used for pressurizing a subsequent reactor. The remaining portion of the depressurizing gas, illustrated by the fraction identified by the letter B in FIG. 4 may then be collected. This will result in raising the average concentration of the enriched product air by approximately 0.2 - 0.5 percent. Likewise, by appropriate cyclic operation of the valving system illustrated in FIG. 3, any one or more of fractions A-H as illustrated in FIG. 4 could be collected thus giving product gas concentrations of varying amounts.

Oxygen yields for the initial and final cycles of a given test period were calculated and compared. Since they agree within an average concentration of less than 1 percent, the results indicate that reproducible cyclic operation is achievable by the method of our invention.

Of the operating parameters studied, we believe that cycle time is one of the important variables affecting oxygen transfer. As the cycle time increases, the amount of oxygen reacted increases to a maximum consistent with "saturation" of the bed at the particular operating conditions used. We also observed that in oxidation cycles, the oxygen concentration at particular points in the bed tended to return to 21 percent after peaking. This indicates that bed saturation had occurred as the oxidation front progressed through the bed. As small cyclic conversions are repeated, the rate of oxidation tends to slow as conversion approaches the level attained in the previous reduction. This kinetic effect was observed for different amounts of cyclic conversion, each less than the maximum possible. While we do not wish to be bound by theory, we believe that the behavior observed results from "kinetic saturation" rather than from equilibrium saturation of the solids. Apparently, a repetitive cyclic reaction occurs in a specific zone within the solid and this zone can be increased or decreased in an amount depending on the cyclic conversion attained. Thus, space velocity and cycle time should be selected so that the bed is switched to reduction just as the peak of the reaction front passes the bottom of the bed and there is no tendency for the bed to return to normal oxygen concentration after peaking.

For example, where the oxidation cycle is continued too long, the exit end of the bed would show lower oxygen concentrations than the middle of the bed. While we do not wish to be bound by theory, we believe that this is caused by using too high an inlet gas temperature. Thus, the feed gas tended to heat rather than to cool the front portion of the bed. As the heat "wave" passed through the bed, it caused some reduction of the oxidized solids which resulted in lower concentrations and thus inefficient use of the bed.

Two such reactors as described above in the example operating in tandem could continuously produce approximately one-half ton of oxygen per day. In this connection, it should be appreciated that where two or more reactors are operating continuously, the oxygen production can be maintained at an even output concentration rather than having a peak as illustrated at about 170 seconds in FIG. 4. For the cycle illustrated in FIG. 4, the average oxygen concentration is 33 percent, and this can be continuously produced by plurality of these reactors operating continuously. The analogy is similar to that of an internal combustion engine. Engines with one cylinder operate with power surges corresponding to the cyclic operation of the engine, whereas engines employing a plurality of cylinders permit a smoothing out of the power delivered. Likewise, the oxygen production can be smoothed out in terms of continuity by using a plurality of reactors.

As shown in the above examples 33 mole percent oxygen can be produced with a reduction pressure of 25 psia. By decreasing the reduction pressure to as low as 7 psia, oxygen concentrations of up to 75 percent may be achieved. Still further, by pulling a more substantial vacuum, down to about 1 psia, and not using reduction feed air at all, substantially pure oxygen may be produced by this process.

It is to be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. In a process for producing oxygen or enrichment of air by increasing its oxygen content which includes the steps of compressing and heating air to elevated pressure and temperature, passing said air into contact with a bed containing an oxygen acceptor compound to oxidize said compound in an oxidation half cycle, and reducing the pressure over said compound to effect reduction of said compound in a reduction half cycle and recovering an oxygen-containing gas therefrom. the improvement wherein:
   a. said bed compound is an active composition of a barium oxide with MgO and CaO,
   b. said bed is maintained at a temperature of from about 1,250°F to about 1,600°F,
   c. the pressure of air over said bed during said oxidation is maintained in a range of from about 14 to about 385 psia,
   d. the pressure over said bed during reduction of said bed is maintained in a range of from about 1 to about 45 psia,
   e. the ratio of said oxidation pressure to said reduction pressure is maintained in a range of from about 1.6 to about 15,
   f. said half cycles of reduction or oxidation, exclusive of pressurization of depressurization, are maintained for a time of from about 30 to about 360 seconds,
   g. said passing of said air through said bed during oxidation is maintained at a space velocity of from about 200 to about 5,000 SCF/cu. ft. bed-hr.,
   h. a lean gas is withdrawn from said bed during oxidation having an oxygen concentration of from about 5 to about 15 mole percent, and
   i. at least one fraction of product gas is withdrawn from said bed during reduction having an oxygen concentration of above about 22 mole percent.

2. The process as in claim 1 wherein said oxygen acceptor bed material is an active composition of $BaO_2$ with Dolomitic Quicklime.

3. The process as in claim 2 wherein:
   a. said bed temperature is from about 1,350° to about 1,500°F,
   b. said oxidation pressure is from about 21 to about 150 psia,
   c. said ratio of oxidation pressure to reduction pressure ranges from about 2.5 to about 8.0,
   d. said half cycle time is from about 60 to about 180 seconds,
   e. said space velocity is from about 700 to about 2,000 SCF (cu. ft. bed-hr.)$^{-1}$,
   f. said pressure over said bed during reduction is from about 7 to about 45 psia, and
   g. said product gas is an enriched air having an oxygen concentration of from about 25 to about 75 mole percent.

4. The process as in claim 1 which includes the added step of passing said compressed air into contact with a bed of barium monoxide to guard said bed oxygen acceptor compound from excess concentrations of water vapor and $CO_2$.

5. The process as in claim 1 which includes steps of pressurizing said bed prior to oxidation and depressurizing said bed between said half cycles of oxidation and reduction.

6. The process as in claim 1 which includes a repetitive sequence of four steps per cycle in the order of reduction, pressurization, oxidation and depressurization, said bed material is disposed in a plurality of reactors some of which are operating in different steps of said cycle with respect to each other, and which includes the step of controlling the flow of gases into and out of said reactors to maintain a substantially uniform output of product gas.

7. The process as in claim 6 wherein a portion of the depressurizing gas exiting from a first reactor is passed into a second reactor to assist in the pressurizing step of said second reactor.

8. The process as in claim 1 wherein said step of withdrawing gases from said bed during reduction includes use of a compressor downstream of said bed to pull gases from said bed.

9. The process as in claim 1 wherein said step of withdrawing product gas includes passing air through said bed during reduction to enrich the oxygen content of said air.

10. The process as in claim 1 wherein the pressure over said bed during reduction is subatmospheric and a fraction of substantially pure oxygen is removed therefrom.

11. The process as in claim 1 which includes the added step of recovering energy from said lean gas by passing it through an expander or turbine.

12. The process as in claim 11 wherein said energy recovery step includes burning a fuel with said lean gas.

13. The process as in claim 12 wherein said energy recovery step includes bypassing a portion of said compressed air to said lean air stream and burning said fuel with said air and said lean air.

14. The process as in claim 1 wherein said step of withdrawing product gas includes withdrawing said gas at an elevated temperature.

15. The process as in claim 14 wherein said step of withdrawing product gas at an elevated temperature includes passing air through said bed during reduction to enrich the oxygen content of said air, and passing said reduction air into heat exchange relationship with said lean gas, or a portion of said product gas.

* * * * *